(12) United States Patent
Narita et al.

(10) Patent No.: US 10,476,083 B2
(45) Date of Patent: Nov. 12, 2019

(54) ELECTRODE MANUFACTURING METHOD

(71) Applicant: HONDA MOTOR CO., LTD., Tokyo (JP)

(72) Inventors: Yuji Narita, Tochigi (JP); Junichi Nakano, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/923,433

(22) Filed: Mar. 16, 2018

(65) Prior Publication Data

US 2018/0277854 A1    Sep. 27, 2018

(30) Foreign Application Priority Data

Mar. 21, 2017    (JP) ................................. 2017-055031

(51) Int. Cl.
| | |
|---|---|
| *H01M 4/04* | (2006.01) |
| *H01M 4/88* | (2006.01) |
| *B05D 1/26* | (2006.01) |
| *B32B 5/00* | (2006.01) |
| *B05D 5/12* | (2006.01) |

(52) U.S. Cl.
CPC .......... *H01M 4/8828* (2013.01); *B05D 1/265* (2013.01); *B32B 5/00* (2013.01); *B05D 5/12* (2013.01); *H01M 4/0404* (2013.01); *H01M 4/0411* (2013.01)

(58) Field of Classification Search
CPC . B32B 5/00; B05D 1/265; B05D 5/12; H01M 4/0404; H01M 4/0411; H01M 4/8828

USPC ................................................ 427/9, 58, 115
See application file for complete search history.

(56) References Cited

U.S. PATENT DOCUMENTS

2009/0325026 A1* 12/2009 Ishitobi .................. C08J 5/2256
429/524

FOREIGN PATENT DOCUMENTS

JP     2011-196755     10/2011

* cited by examiner

*Primary Examiner* — Brian K Talbot
(74) *Attorney, Agent, or Firm* — Rankin, Hill & Clark LLP

(57) ABSTRACT

A length L between the markings 11a measured by the pre-coating thickness measuring device 17 and a length L' between the markings 11a measured by the post-coating thickness measuring device 18 are calculated, and a length ratio is obtained. Measurement positions of thickness data measured by the post-coating thickness measuring device 18 are corrected based on the calculated length ratio. A value at each measurement position of pre-coating thickness information on a corrected post-coating thickness interpolation line connecting measurement points of corrected post-coating thickness information obtained by correcting the measurement positions with a line segment is determined as post-coating thickness at each measurement position. A difference between the determined value and the pre-coating thickness is calculated. If it is in a predetermined range, the electrode is determined as a non-defective product.

2 Claims, 6 Drawing Sheets

ELECTRODE MANUFACTURING METHOD

BACKGROUND OF THE INVENTION

Field of the Invention

The present invention relates to an electrode manufacturing method and apparatus for manufacturing an electrode by applying electrode ink to an electrode substrate.

Description of the Related Art

In general, an electrode manufacturing apparatus manufactures an electrode to be used in a fuel cell by applying electrode ink to an electrode substrate, such as carbon paper, while conveying the substrate. The electrode, if the coating thickness of the electrode ink is not appropriate, affects battery performances. It is therefore required to measure the coating thickness of the electrode ink to perform non-defective product determination.

A radiation measuring apparatus discussed in Japanese Patent Application Laid-Open No. 2011-196755 includes a radiation source and a sensor, and detects the coating thickness of an electrode substrate based on the intensity of radiation reaching the sensor from the radiation source through the electrode substrate.

The radiation measuring apparatus discussed in Japanese Patent Application Laid-Open No. 2011-196755 detects the thickness of the electrode substrate at both a coated portion and a non-coated portion to calculate the coating thickness based on a difference of the detected thicknesses. However, the apparatus does not detect the thickness of the coating portion and a non-coating portion at the same position. Therefore, when there is variation in the thickness of the electrode substrate, it is not able to accurately calculating the coating thickness.

Further, what is called a roll-to-roll manufacturing method may be employed in the electrode manufacturing. According to this manufacturing method, an elongated electrode substrate is conveyed from an unwinding roll to a winding roll while the electrode substrate is tensioned. Therefore, there are cases where the electrode substrate is stretched during the conveyance. Once such a stretching occurs, it is difficult to detect the thickness at the same position, and it is thus no longer possible to accurately calculate the coating thickness, as mentioned above.

SUMMARY OF THE INVENTION

In view of the foregoing problems, the present invention intends to provide an electrode manufacturing method and apparatus capable of calculating the coating thickness.

The present invention provides an electrode manufacturing method for manufacturing an electrode by applying electrode ink to an electrode substrate having markings provided at a first interval while conveying the electrode substrate. The electrode manufacturing method includes a pre-coating thickness information generation step of measuring a thickness of the electrode substrate at a second interval smaller than the first interval between neighboring two of the markings before applying the electrode ink, and generating a plurality of pieces of pre-coating thickness information including information about a measurement position of one of the two markings, a coating step of applying the electrode ink to the electrode substrate after the pre-coating thickness information generation step, a post-coating thickness information generation step of measuring the thickness of the electrode substrate at a third interval smaller than the first interval between the two markings in a region to which the electrode ink has been applied, and generating a plurality of pieces of post-coating thickness information including information about the measurement position of the one of the two markings that is the same as in the pre-coating thickness information generation step, a length ratio calculation step of detecting a length between the two markings in each of the pre-coating thickness information generation step and the post-coating thickness information generation step, and calculating a ratio of the length between the two markings in one of the pre-coating thickness information generation step and the post-coating thickness information generation step to the length between the two markings in the other generation step, a measurement position correction step of performing correction by dividing position information measured for each of the plurality of pieces of thickness information in the other generation step by the length ratio calculated in the length ratio calculation step to obtain a plurality of pieces of corrected thickness information in the other generation step, a coating thickness calculation step of determining the thickness of the electrode substrate in the other generation step corresponding to the measurement position of the pre-coating or post-coating thickness information in the one generation step as a value on a corrected thickness interpolation line obtained by linearly interpolating the measurement positions of the plurality of pieces of corrected thickness information in the other generation step, and calculating, as a coating thickness, a difference between the determined thickness in the other generation step and the thickness of the electrode substrate at the measurement position in the one generation step, and a determination step of determining the electrode as a non-defective product if the coating thickness calculated in the coating thickness calculation step is in a predetermined range and determining as a defective product if not in the predetermined range.

According to the present invention, the length between the markings is detected in each of the pre-coating thickness information generation step of measuring the thickness of the electrode substrate at the second interval before applying the electrode ink and the post-coating thickness information generation step of measuring the thickness of the electrode substrate at the third interval in the region to which the electrode ink has been applied, and the length ratio is calculated. The measured position information in the post-coating thickness information generated in the post-coating thickness information generation step (or the measured position information in pre-coating thickness information generated in the pre-coating thickness information generation step) is corrected with reference to the calculated length ratio.

The calculation of the coating thickness is performed by generating a corrected post-coating thickness interpolation line (or a corrected pre-coating thickness interpolation line) linearly interpolated by connecting a plurality of pieces of corrected post-coating thickness information (or corrected pre-coating thickness information), and determining the value of a point on the line as post-coating thickness (or pre-coating thickness) and then obtaining a difference between the value on the line at the measurement position of the pre-coating thickness information (or the post-coating thickness information) and the pre-coating thickness (or the post-coating thickness). This method enables measurement thickness calculation in consideration of the stretching of the electrode substrate in a conveyance direction, so that accurate coating thickness can be calculated. As a result, non-defective product determination based on the coating thickness can be accurately performed.

Further, it is desirable to include a defective product marking step of providing a defective product marking to the electrode ink applied region of the electrode substrate determined as a defective product when the electrode has been determined as the defective product in the determination step.

By using the above-mentioned arrangement, the display of non-defective product determination result is made easy to understand.

The present invention provides an electrode manufacturing apparatus for manufacturing an electrode by applying electrode ink to an electrode substrate having markings provided at a first interval while conveying electrode substrate. The electrode manufacturing apparatus includes a pre-coating thickness information generation unit configured to measure a thickness of the electrode substrate at a second interval smaller than the first interval between neighboring two of the markings before applying the electrode ink and generate a plurality of pieces of pre-coating thickness information including information about a measurement position of one of the two markings, a coating unit configured to apply the electrode ink to the electrode substrate after the generation by the pre-coating thickness information generation unit, a post-coating thickness information generation unit configured to measure the thickness of the electrode substrate at a third interval smaller than the first interval in a region to which the electrode ink has been applied between the two markings and generate a plurality of pieces of post-coating thickness information including information about the measurement position of the one of the two markings that is same as in the pre-coating thickness information generation unit, a length ratio calculation unit configured to detect a length between the two markings in each of the pre-coating thickness information generation unit and the post-coating thickness information generation unit, and calculate a ratio of the length between the two markings in one generation unit of the pre-coating thickness information generation unit and the post-coating thickness information generation unit to the length between the two markings in the other generation unit, a measurement position correction unit configured to perform correction by dividing position information measured for each of the plurality of pieces of thickness information in the other generation unit by the length ratio calculated in the length ratio calculation unit to obtain a plurality of pieces of corrected thickness information in the other generation unit, a coating thickness calculation unit configured to determine the thickness of the electrode substrate in the other generation unit corresponding to the measurement position of the pre-coating or post-coating thickness information in the one generation unit as a value on a corrected thickness interpolation line obtained by linearly interpolating the measurement positions of the plurality of pieces of corrected thickness information in the other generation unit, and calculate, as a coating thickness, a difference between the determined thickness in the other generation unit and the thickness of the electrode substrate at the measurement position in the one generation unit, and a determination unit configured to determine the electrode as a non-defective product if the coating thickness calculated by the coating thickness calculation unit is in a predetermined range and determine as a defective product if not in the predetermined range.

According to the present invention, the length between the markings is detected in each of the pre-coating thickness information generation unit configured to measure the thickness of the electrode substrate at the second interval before applying electrode ink and the post-coating thickness information generation unit configured to measure the thickness of the electrode substrate at the third interval in the electrode ink applied region, and the length ratio is calculated. The measured position information in the post-coating thickness information generated in the post-coating thickness information generation unit (or the measured position information in the pre-coating thickness information generated in the pre-coating thickness information generation unit) is corrected with reference to the calculated length ratio. Therefore, the present invention enables measurement thickness calculation in consideration of the stretching of the electrode substrate in the conveyance direction according to the above-mentioned calculation method. As a result, accurately calculating the coating thickness is feasible.

According to the present invention, the coating thickness can be accurately calculated.

DETAILED DESCRIPTION OF THE PREFERRED EMBODIMENT

An embodiment of the present invention will be described in detail below with reference to the attached drawings.

Figure 1:
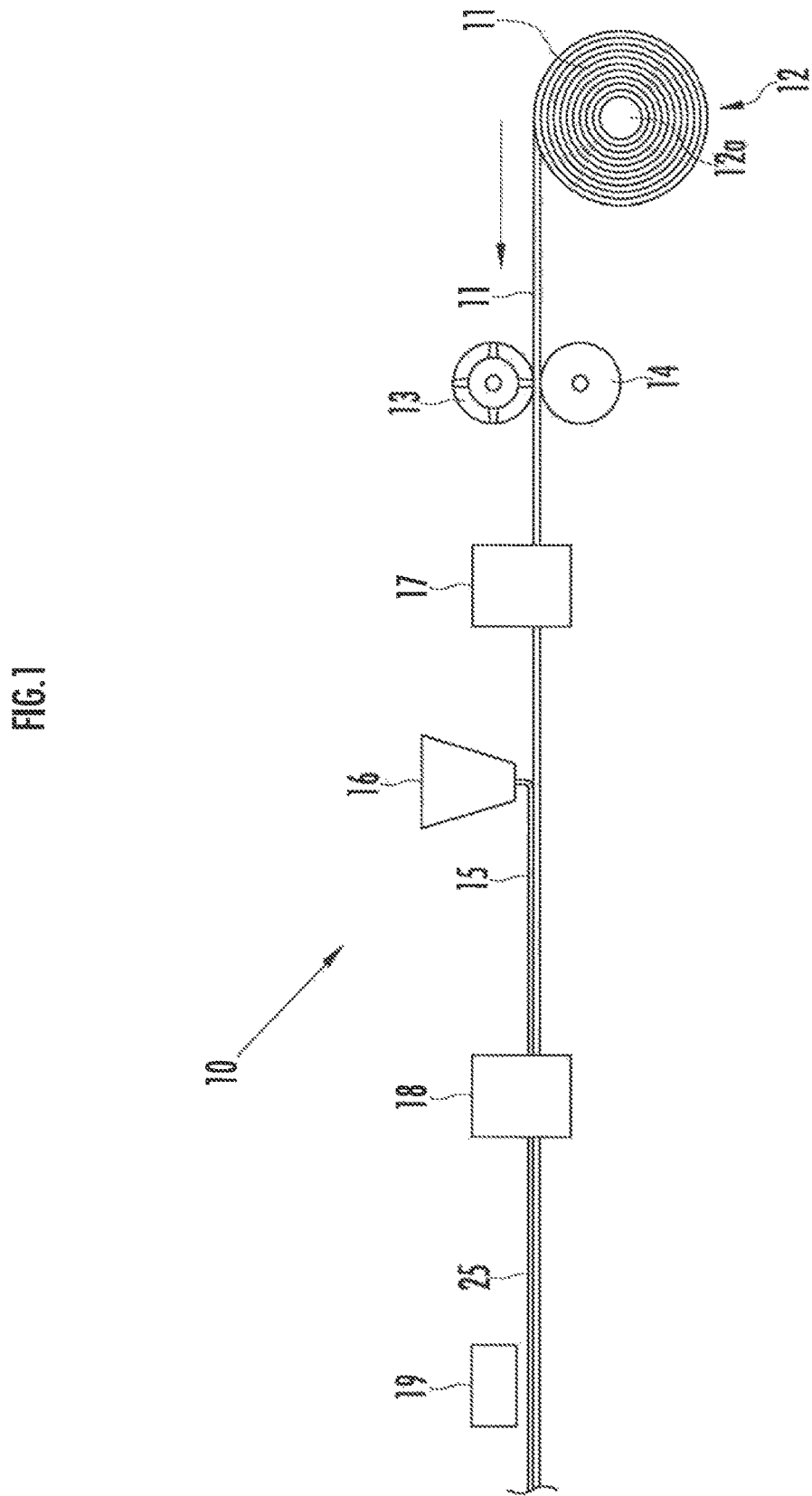
FIG. 1 is a side view illustrating an electrode manufacturing apparatus according to the present invention.
Figure 2:
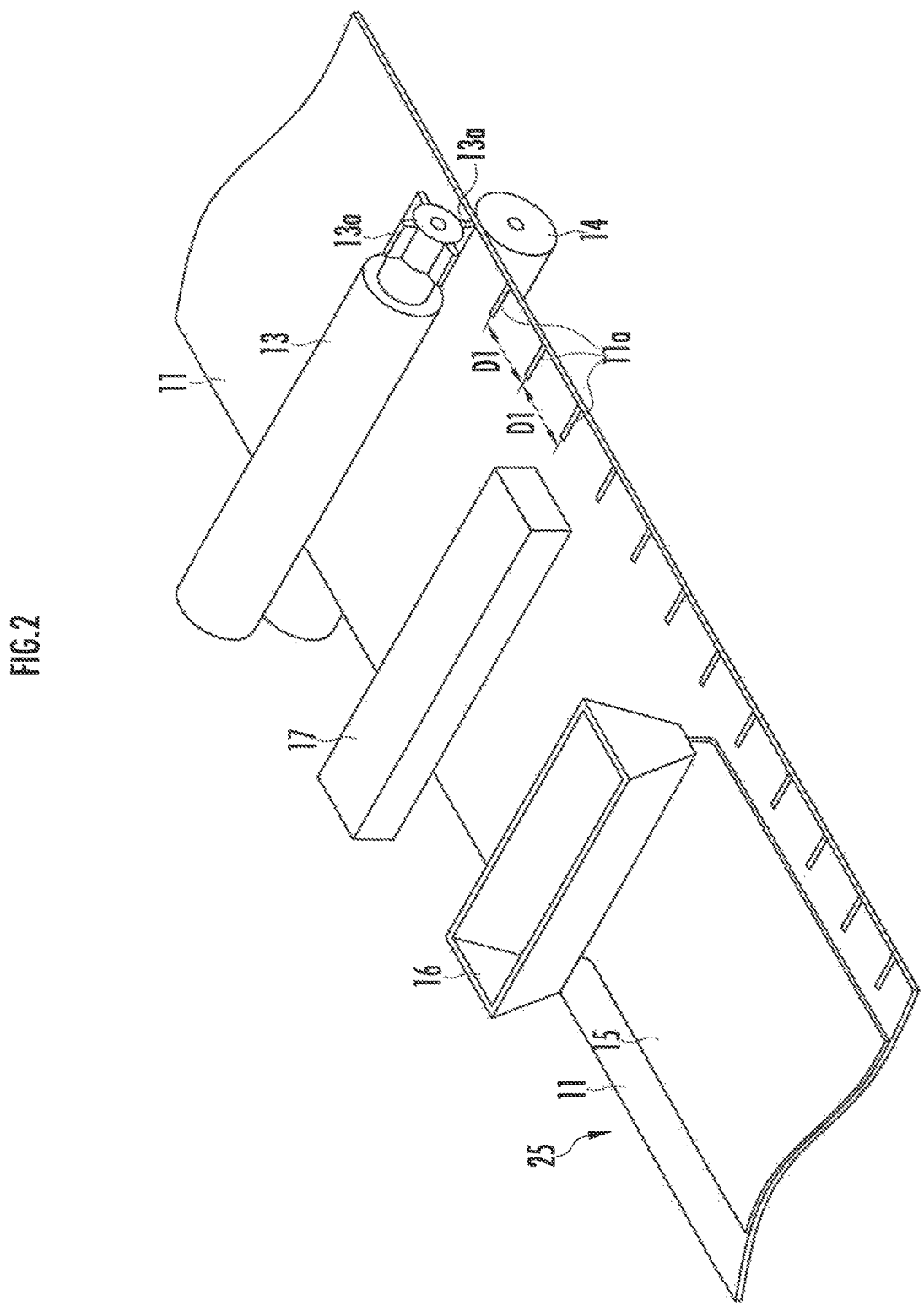
FIG. 2 is a perspective view illustrating main parts of the electrode manufacturing apparatus.

As illustrated in FIGS. 1 and 2, an electrode manufacturing apparatus 10 includes a supply unit 12 configured to supply an electrode sheet 11 (an electrode substrate), a first conveyance roller 13 and a second conveyance roller 14 configured to convey the electrode sheet 11 supplied from the supply unit 12, and a coating die 16 configured to apply electrode ink 15 on the electrode sheet 11. The electrode sheet 11 is, for example, carbon paper (CP).

Figure 3:
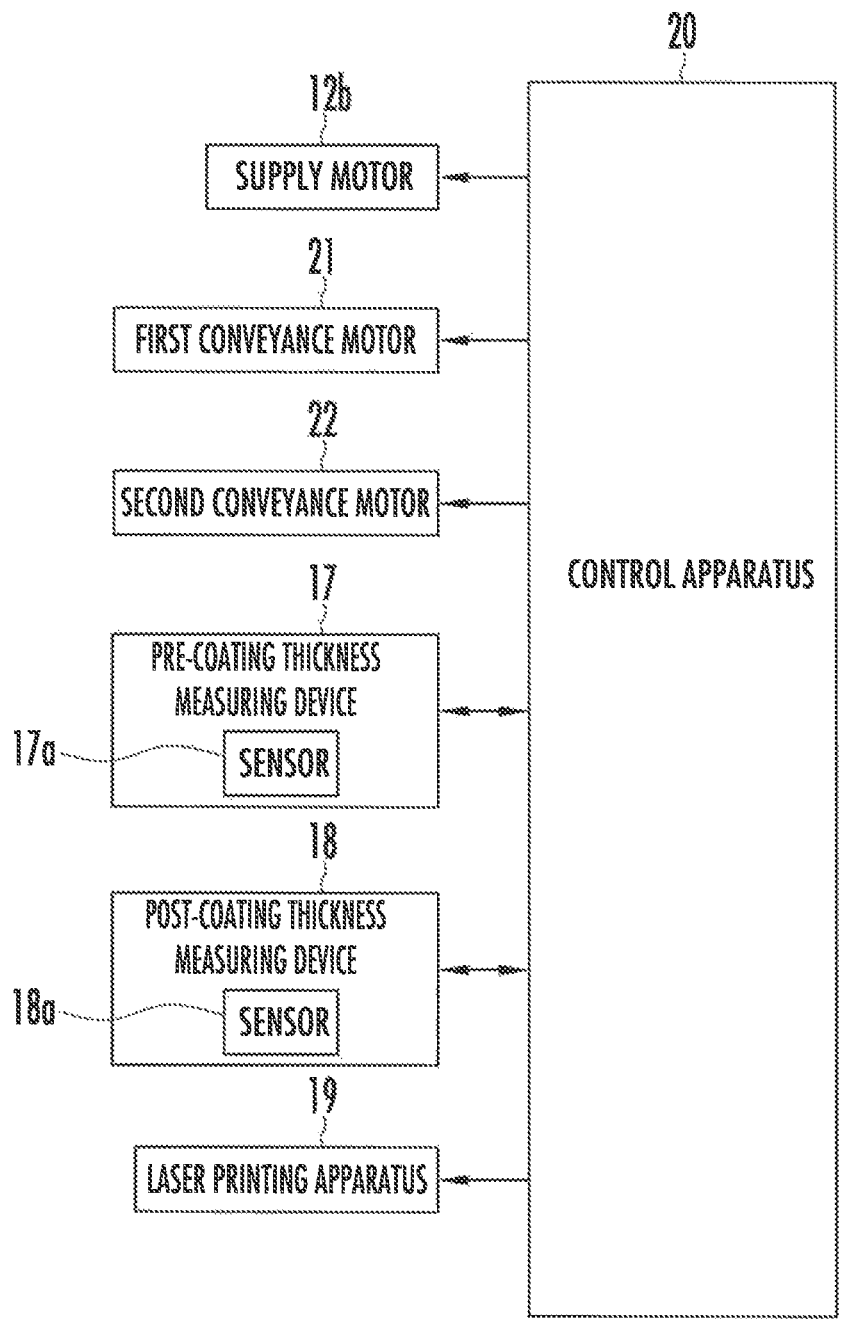
FIG. 3 is a block diagram illustrating an electrical arrangement of the electrode manufacturing apparatus.

The electrode manufacturing apparatus 10 includes a pre-coating thickness measuring device 17 configured to measure the thickness of the electrode sheet 11 before the electrode ink 15 is applied by the coating die 16, a post-coating thickness measuring device 18 configured to measure the thickness of the electrode sheet 11 after the electrode ink 15 has been applied by the coating die 16, a laser printing apparatus 19, and a control apparatus 20 (see FIG. 3) configured to totally control the electrode manufacturing apparatus 10.

The supply unit 12 includes a rotary shaft 12a inserted in the roll-shaped electrode sheet 11 and a supply motor 12b (see FIG. 3) that rotates the rotary shaft 12a. The control apparatus 20 controls driving of the supply motor 12b.

A first conveyance motor 21 (see FIG. 3) rotates the first conveyance roller 13, and a second conveyance motor 22 (see FIG. 3) rotates the second conveyance roller 14. The control apparatus 20 controls driving of the first and second conveyance motors 21 and 22.

The electrode sheet 11 is conveyed while being sandwiched between the first conveyance roller 13 and the second conveyance roller 14. At an end of the first conveyance roller 13, four blade-like marking portions 13a are formed at a pitch of 90° to provide markings 11a aligned along an edge of the electrode sheet 11.

If the marking portion 13a is brought into contact with the electrode sheet 11 while the first conveyance roller 13 rotates, a corresponding marking 11a is provided (stamped) on the edge of the electrode sheet 11. As the marking portions 13a are formed at the pitch of 90°, the markings 11a are provided on the electrode sheet 11 at a predetermined first interval D1.

The coating die 16 discharges the electrode ink 15 so that the electrode ink 15 having a predetermined thickness can be applied on the electrode sheet 11.

The pre-coating thickness measuring device 17 is, for example, a well-known X-ray thickness gauge that measures the thickness of the electrode sheet 11 based on an attenuation amount when X-rays emitted from an X-ray tube penetrate through the electrode sheet 11. The pre-coating thickness measuring device 17 includes a sensor 17a (see FIG. 3) that detects the markings 11a.

The control apparatus 20 controls driving of the pre-coating thickness measuring device 17 to measure the thickness of the electrode sheet 11 at a second interval D2 (see FIG. 4) smaller than the first interval D1.

The post-coating thickness measuring device 18 is, for example, an X-ray thickness gauge similar to the pre-coating thickness measuring device 17. The post-coating thickness measuring device 18 measures the thickness of the electrode sheet 11 at a region to which the electrode ink 15 has been applied by the coating die 16. The post-coating thickness measuring device 18 includes a sensor 18a (see FIG. 3) that detects the markings 11a.

The control apparatus 20 controls driving of the post-coating thickness measuring device 18 to measure the thickness of the electrode sheet 11 at a third interval D3 (see FIG. 5) smaller than the first interval D1.

The laser printing apparatus 19 is configured to perform printing on the electrode sheet 11 with a laser. The control apparatus 20 controls driving of the laser printing apparatus 19.

[Electrode Manufacturing Processes]

When the electrode manufacturing apparatus 10 starts manufacturing of an electrode, the control apparatus 20 drives the supply motor 12b of the supply unit 12 to rotate the rotary shaft 12a inserted in the roll-shaped electrode sheet 11. In accordance with rotation of the rotary shaft 12a, the roll-shaped electrode sheet 11 is supplied in the conveyance direction. The control apparatus 20 controls driving of the supply motor 12b in such a manner that the electrode sheet 11 can be supplied at a predetermined speed.

The electrode sheet 11 supplied from the supply unit 12 is conveyed toward the first conveyance roller 13 and the second conveyance roller 14.

The control apparatus 20 drives the first conveyance motor 21 to rotate the first conveyance roller 13 in the clockwise direction, and drives the second conveyance motor 22 to rotate the second conveyance roller 14 in the counterclockwise direction.

The electrode sheet 11 sandwiched between the first conveyance roller 13 and the second conveyance roller 14 is conveyed by the first and second conveyance rollers 13 and 14 rotated by the first and second conveyance motors 21 and 22. During this conveyance, the marking portions 13a are brought into contact with the electrode sheet 11, and the markings 11a are provided along an edge of the electrode sheet 11. When the electrode sheet 11 is continuously conveyed and the second conveyance roller 14 is continuously rotated, the markings 11a are provided on the electrode sheet 11 at the first interval D1.

The electrode sheet 11 on which the markings 11a have been provided is conveyed to the pre-coating thickness measuring device 17.

The pre-coating thickness measuring device 17 measures the thickness of the electrode sheet 11 at the second interval D2 smaller than the first interval D1 before the electrode ink 15 is applied. The pre-coating thickness measuring device 17 detects the markings 11a with the sensor 17a and transmits marking detection information to the control apparatus 20.

In the present embodiment, the second interval D2 is set to be equal to 1/10 of the first interval D1 at the time when the markings 11a have been provided. Further, the pre-coating thickness measuring device 17 performs measurement at the position where each marking 11a is provided. More specifically, the pre-coating thickness measuring device 17 is configured to measure the thickness of the electrode sheet 11, 10 times, between two neighboring markings 11a (pre-coating thickness information generation step).

The pre-coating thickness measuring device 17 transmits measured thickness data to the control apparatus 20. The measured thickness data includes measured position information indicating the distance from the position where the marking 11a is provided to each measurement point.

The electrode sheet 11 with the thickness measured by the pre-coating thickness measuring device 17 is conveyed to the coating die 16. The coating die 16 discharges the electrode ink 15 so that the electrode ink 15 having the predetermined thickness can be applied on the electrode sheet 11 (coating step).

The electrode sheet 11 coated with the electrode ink 15 applied by the coating die 16 becomes an electrode 25 and is conveyed to the post-coating thickness measuring device 18. During this conveyance, the electrode ink 15 is dried.

The post-coating thickness measuring device 18 measures the thickness of the electrode 25 at the third interval D3 smaller than the first interval D1 in the region to which the electrode ink 15 has been applied by the coating die 16 (post-coating thickness information generation step). In the present embodiment, the third interval D3 is equal to the second interval D2 or can be different from the second interval D2.

The post-coating thickness measuring device 18 detects the markings 11a with the sensor 18a, and transmits marking detection information to the control apparatus. Further, the post-coating thickness measuring device 18 performs measurement at the position where each marking 11a is provided.

The post-coating thickness measuring device 18 transmits measured thickness data to the control apparatus 20. The measured thickness data includes measured position information indicating the distance from the position where the marking 11a is provided to each measurement point.

Figure 4:
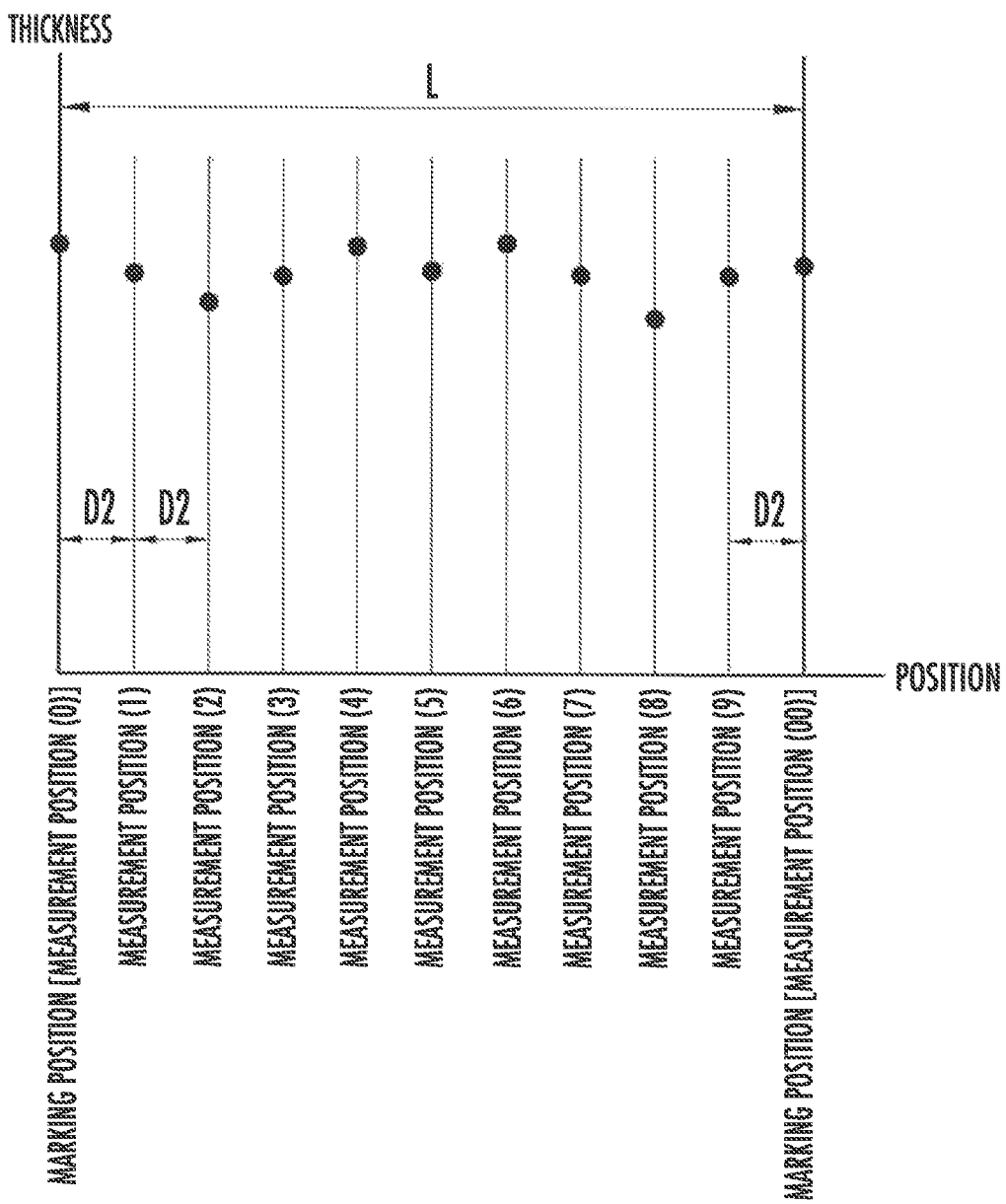
FIG. 4 is a graph illustrating pre-coating electrode sheet thickness measurement data.

As illustrated in FIG. 4, the measured thickness data transmitted from the pre-coating thickness measuring device 17 includes data obtained by performing thickness measurement (at measurement positions (0) to (9)) at the same interval (the second interval D2) from the position of the first marking 11a (the left side in FIG. 4) and performing thickness measurement (at a measurement position (00)) at the position of the second marking 11a (the right side in FIG. 4).

Figure 5:
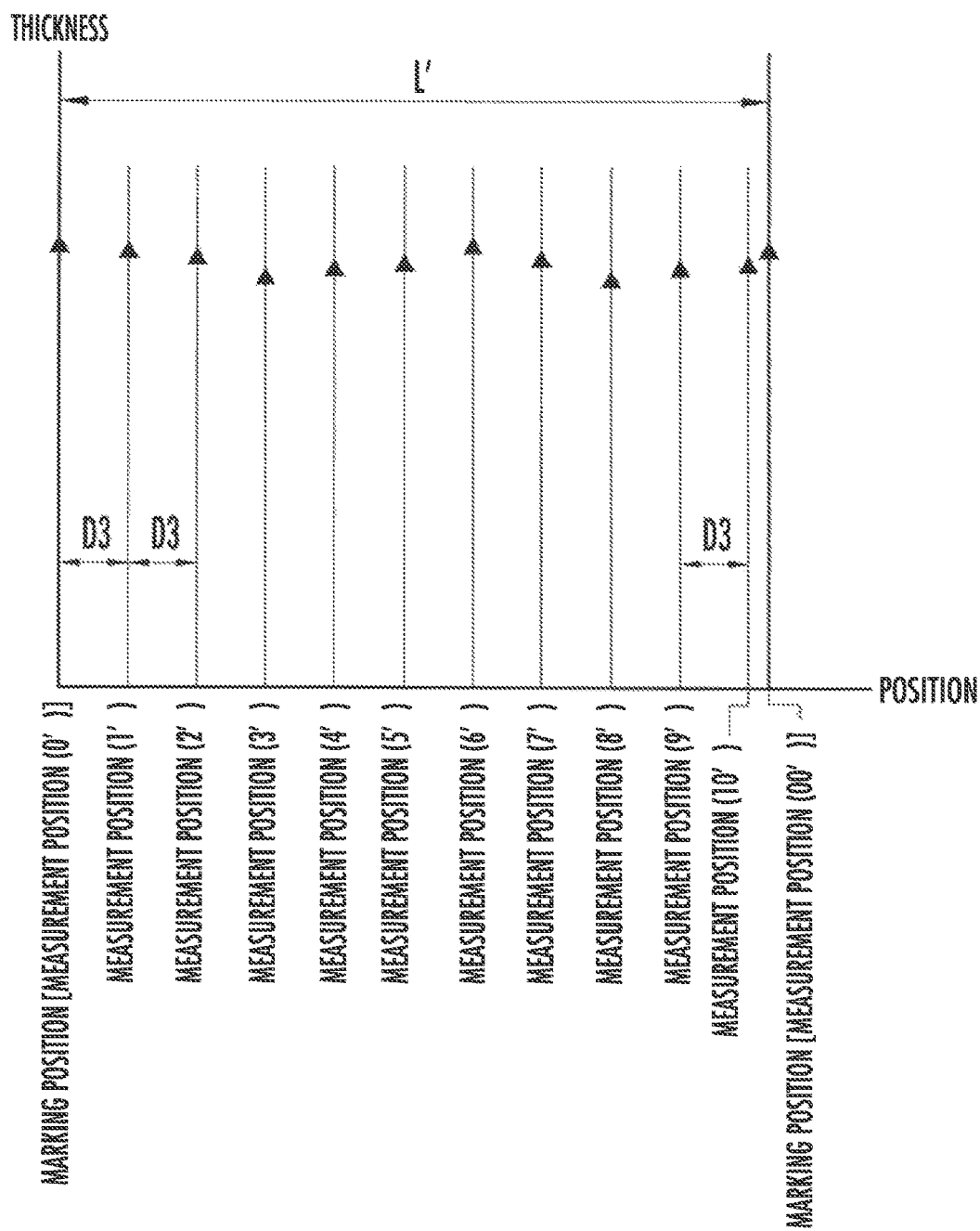
FIG. 5 is a graph illustrating post-coating electrode sheet thickness measurement data.

As illustrated in FIG. 5, the measured thickness data transmitted from the post-coating thickness measuring device 18 includes data obtained by performing thickness measurement (at measurement positions (0') to (10')) at the same interval (the third interval D3 that is identical to the second interval D2) from the position of the first marking 11a (the left side in FIG. 5). In this case, because the electrode sheet 11 stretches due to the tension applied thereon, in a post-coating state, the position of the tenth measurement point (measurement position (10')) deviates from the position of the second marking 11a (the right side in FIG. 5).

The control apparatus 20 calculates a length L between the markings 11a measured by the pre-coating thickness measuring device 17 based on the marking detection information from the sensor 17a of the pre-coating thickness measuring device 17. Further, the control apparatus 20 calculates a length L' between the markings 11a measured by the post-coating thickness measuring device 18 based on the marking detection information from the sensor 18a of the post-coating thickness measuring device 18.

Figure 6:
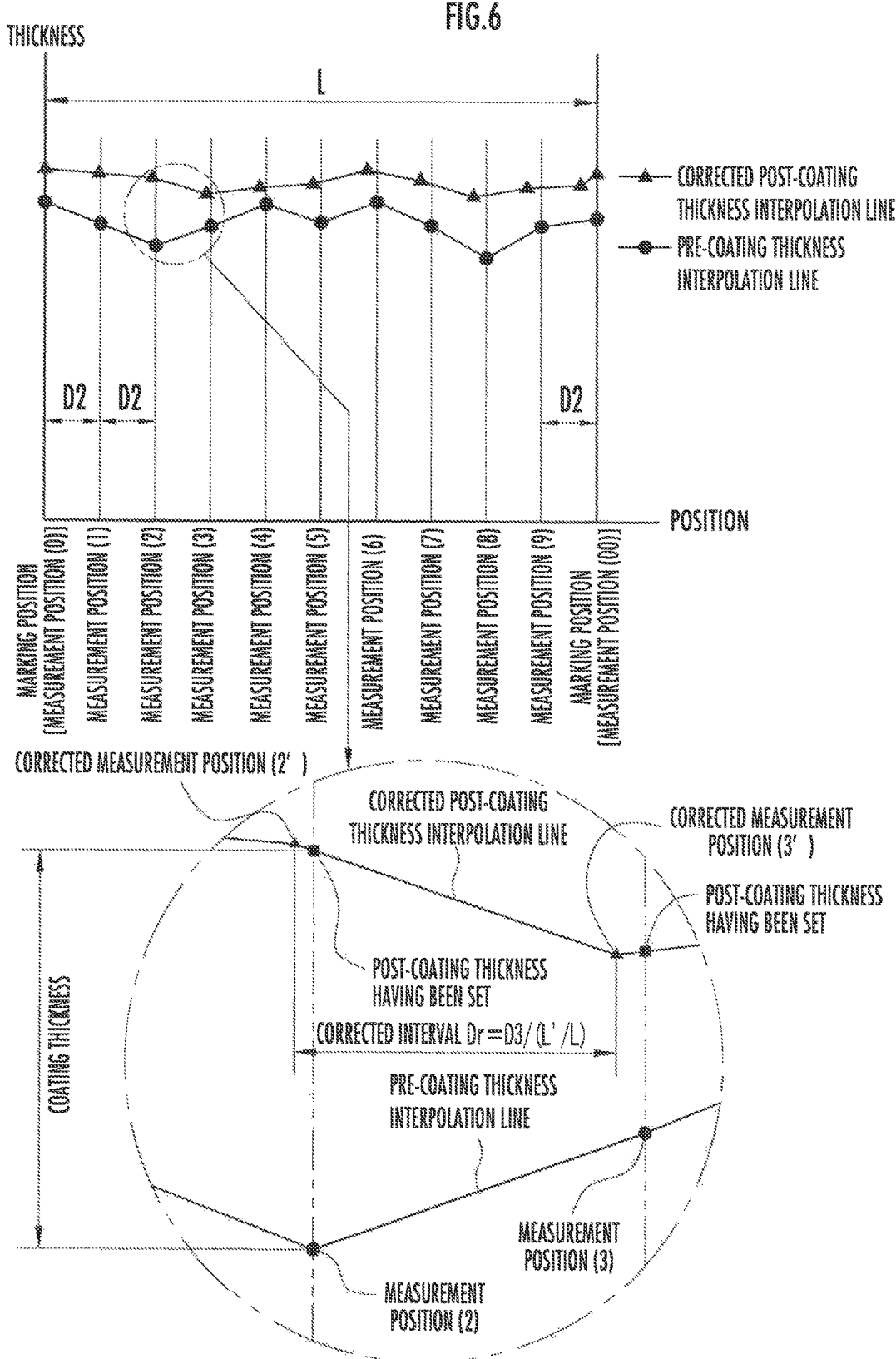
FIG. 6 is a graph illustrating both the pre-coating electrode sheet thickness measurement data and corrected post-coating electrode sheet thickness measurement data.

The control apparatus 20 calculates a length ratio of the length L between the markings 11a obtained by the pre-coating thickness measuring device 17 and the length L' between the markings 11a obtained by the post-coating thickness measuring device 18 (length ratio calculation step). Then, as illustrated in FIG. 6, the control apparatus 20 corrects (compresses) the measurement positions of the measured thickness data transmitted from the post-coating thickness measuring device 18 based on the calculated length ratio (measurement position correction step). More specifically, the control apparatus 20 divides the measurement positions of post-coating thickness information by L'/L, i.e., a ratio of the post-coating length L' between the markings 11a to the pre-coating length L between the markings 11a.

Accordingly, a correction interval Dr between the measurement positions obtained by correcting the measurement positions of the measured thickness data transmitted from the post-coating thickness measuring device 18 can be calculated as D3/(L'/L).

In addition, a corrected post-coating thickness interpolation line can be obtained by connecting (linearly interpolating) the measurement points of post-coating thickness information obtained by correcting the measurement positions as described above, with a line segment.

The control apparatus 20, when calculating the coating thickness of the electrode ink 15 applied to the electrode sheet 11, determines a value on the above-mentioned corrected post-coating thickness interpolation line at each measurement position of pre-coating thickness information as post-coating thickness at each measurement position (post-coating thickness having been set), and calculates a difference between the determined value and the pre-coating thickness to obtain the thickness of the electrode ink 15 applied to the electrode sheet 11 (coating thickness calculation step). The control apparatus 20 performs the above-mentioned coating thickness calculation processing at each measurement point.

The control apparatus 20 determines whether the calculated thickness of the electrode ink 15 applied to the electrode sheet 11 (hereinafter, referred to as "calculated coating thickness") is in a predetermined range having been set, and determines that the electrode is a non-defective product if the calculated coating thickness is in the predetermined range (determination step).

On the other hand, if it is determined that the calculated coating thickness is not within the predetermined range, the control apparatus 20 determines that the electrode is a defective product and drives the laser printing apparatus 19 to print, for example, an NG mark indicating defectiveness of the product at a corresponding edge of the electrode sheet 11 (defective product marking step). As an example, the laser printing apparatus 19 may be provided as an apparatus not included in the electrode manufacturing apparatus 10.

A winding device (not illustrated) winds up the electrode 25 having passed through the laser printing apparatus 19.

As mentioned above, even when the electrode sheet 11 is stretched in the conveyance direction, calculating the thickness of the electrode ink 15 applied to the electrode sheet 11 is feasible, and non-defective product determination can be performed based on the calculated coating thickness.

In the above-mentioned embodiment, the first conveyance roller 13 of the electrode manufacturing apparatus 10 is equipped with the marking portions 13a, and the marking portions 13a provide the markings 11a on the electrode sheet 11. However, the marking portions 13a may be unnecessary if the markings 11a are provided beforehand on the electrode sheet 11. Further, the marking method may be appropriately changeable.

In the above-mentioned embodiment, the pre-coating thickness measuring device 17 and the post-coating thickness measuring device 18 are X-ray thickness gauges but not limited thereto. For example, a line sensor is employable that measures radiation emitted from a radiation source, so that the thickness can be calculated based on the measurement result, as long as such device can measure the thickness.

In the above-mentioned embodiment the correction is performed in such a manner that post-coating thickness measurement positions are adjusted to pre-coating thickness measurement positions. However, contrary to this correction, the pre-coating thickness measurement positions can be adjusted to the post-coating thickness measurement positions for correction. Further, performing the thickness measurement at marking positions may be dispensable, if obtaining thickness measurement position information for each marking is ensured.

What is claimed is:

1. An electrode manufacturing method for manufacturing an electrode by applying electrode ink to an electrode substrate having markings provided at a first interval while conveying the electrode substrate, the method comprising:

a pre-coating thickness information generation step of measuring a thickness of the electrode substrate at a second interval smaller than the first interval between neighboring two of the markings before applying the electrode ink, and generating a plurality of pieces of pre-coating thickness information including information about a measurement position of one of the two markings;

a coating step of applying the electrode ink to the electrode substrate after the pre-coating thickness information generation step;

a post-coating thickness information generation step of measuring the thickness of the electrode substrate at a third interval smaller than the first interval between the two markings in a region to which the electrode ink has been applied, and generating a plurality of pieces of post-coating thickness information including information about the measurement position of the one of the two markings that is same as in the pre-coating thickness information generation step;

a length ratio calculation step of detecting a length between the two markings in each of the pre-coating thickness information generation step and the post-coating thickness information generation step, and calculating a ratio of the length between the two markings in one generation step of the pre-coating thickness information generation step and the post-coating thickness information generation step to the length between the two markings in the other generation step;

a measurement position correction step of performing correction by dividing position information measured for each of the plurality of pieces of thickness information in the other generation step by the length ratio calculated in the length ratio calculation step to obtain a plurality of pieces of corrected thickness information in the other generation step;

a coating thickness calculation step of determining the thickness of the electrode substrate in the other generation step corresponding to the measurement position of the pre-coating or post-coating thickness information in the one generation step as a value on a corrected thickness interpolation line obtained by linearly interpolating the measurement positions of the plurality of pieces of corrected thickness information in the other generation step, and calculating, as a coating thickness, a difference between the determined thickness in the other generation step and the thickness of the electrode substrate at the measurement position in the one generation step; and a determination step of determining the electrode as a non-defective product if the coating thickness calculated in the coating thickness calculation step is in a predetermined range and determining as a defective product if not in the predetermined range.

2. The electrode manufacturing method according to claim 1, further comprising:

a defective product marking step of providing a defective product marking to the electrode ink applied region of the electrode substrate determined as a defective product in a case where the electrode has been determined as the defective product in the determination step.

* * * * *